Sept. 17, 1963

A. HUET 3,103,918

DEVICE FOR THE CONTROLLED CIRCULATION
OF WATER IN AN EVAPORATOR ASSEMBLY

Filed March 8, 1960

INVENTOR

ANDRÉ HUET

BY *Robert E. Burns*

ATTORNEY

Sept. 17, 1963 A. HUET 3,103,918
DEVICE FOR THE CONTROLLED CIRCULATION
OF WATER IN AN EVAPORATOR ASSEMBLY
Filed March 8, 1960 2 Sheets-Sheet 2

INVENTOR
ANDRÉ HUET
BY *Robert E. Burns*
ATTORNEY

United States Patent Office 3,103,918
Patented Sept. 17, 1963

3,103,918
DEVICE FOR THE CONTROLLED CIRCULATION
OF WATER IN AN EVAPORATOR ASSEMBLY
André Huet, 48 Ave. du President Wilson,
Paris, France
Filed Mar. 8, 1960, Ser. No. 13,540
Claims priority, application France Mar. 12, 1959
7 Claims. (Cl. 122—407)

The applicant has already described a thermal installation for the recuperation of heat from a nuclear reactor comprising a plurality of identical columns traversed by the fluid which issues from the nuclear reactor and from which heat is to be recuperated, each of said columns containing the necessary elements for converting water into steam in one or more stages of pressure. These elements generally comprise for each pressure stage: A re-heating device for the water supply; an evaporator, comprising eventually a water-and-steam tank surrounded by water pipes; a water-and-steam separator; and a super-heater. In some of the installations described by the applicant, particularly in those which comprise a water-and-steam tank, the circulation of water in the evaporator was usually a natural circulation.

The present invention has for its object to provide for a thermal installation of the above-mentioned type a controlled circulation device for the water in the evaporator in order to cope, if necessary, with an increased demand for steam for the turbine associated with the installation.

According to the invention, in each evaporator of each column of the installation, water is removed through a pipe either in the water-and-steam tank of the evaporator if such a tank is employed, or in the water-and-steam separator when no such tank is employed. This water is collected by a system of subsidiary collector pipes, to pass through a circuit outside the columns comprising a circulation pump which forces the water into a second distribution system, the latter terminating in pipes rising in each column to the base of the evaporator pipes.

In this location the re-injection of the pressurized water may be effected by injectors at the level of the lower subsidiary collector pipes of the evaporator to which the straight or helical pipes of said evaporator are connected. Preferably, the water is re-injected at the input of each subsidiary collector pipe by means of a Venturi tube.

If each of the columns of the installation is constituted merely by a vertical evaporator pipe in which the water steam mixture is subjected to a gyratory movement facilitating the axial separation of water and steam, the water is re-injected either at the lower end of the pipe or tangentially of the inner surface of said pipe in such a way that the gyratory movement of the assembly is enhanced.

The following description, given by way of example and with reference to the annexed drawings, will make it easy to understand how the invention can be put into practical effect.

Figure 1:
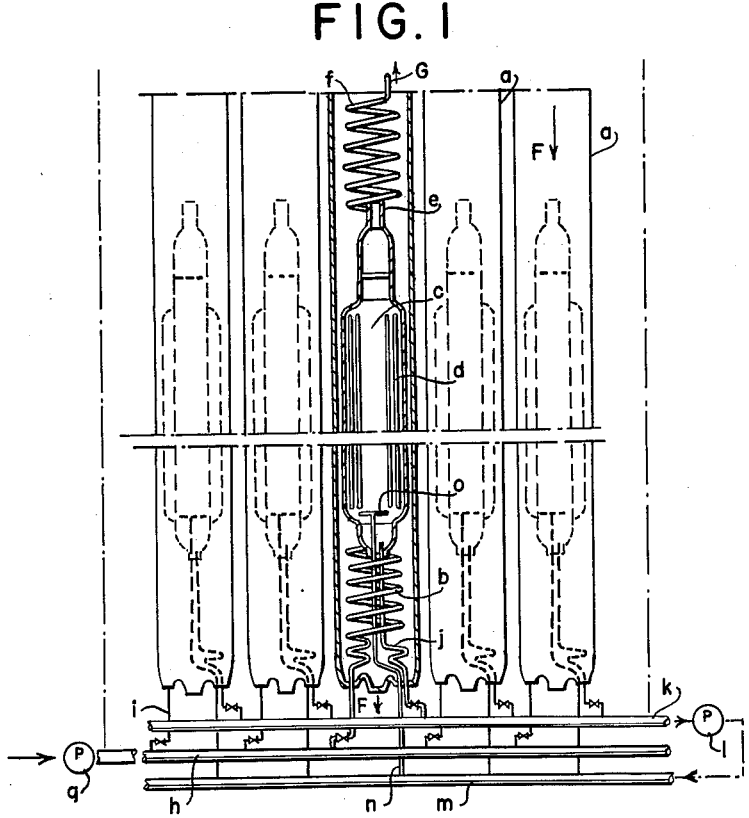
FIG. 1 shows diagrammatically the application of the circulation device forming the object of the invention to an assembly of vertical columns each comprising an evaporator with a water-and-steam tank.

In the embodiment shown in FIG. 1, the thermal installation to which the circulation device forming the object of the invention is to be adapted, is constituted by an assembly of vertical columns $a$ of which only five are shown, in the drawing and all of which are traversed from top to bottom in the direction of arrows F by a hot fluid, issuing from a nuclear reactor, from which heat is to be recuperated. Each of these columns comprises elements for the production of steam possibly in different stages of pressure. Only the lower stage in these columns, furnishing steam at low pressures is shown in the drawing, this stage comprising substantially: a re-heater $b$; an evaporator $c$ with a central water-and-steam tank and arrangement of water-and-steam pipes $d$ all around the central body $c$; a water steam separator $e$ and a super-heater $f$ which delivers steam at low pressure in the direction of arrow G. These elements are shown diagrammatically and in some greater detail only in the centre column of FIG. 1, it being well understood, however, that all these columns are identical. A supply of water is furnished by the pump $g$ which, by means of the duct $h$, supplies the base of each re-heater $b$ with water through tubes such as $i$.

In an installation of this type the circulation of water is a natural one, that is the steam liberated from the water-and-steam tank $c$ escapes towards the superheater, where as the water descends again inside the central water-and-steam tank $c$, subsequently to rise again in the lateral pipes $d$ in which it evaporates.

According to the invention, there is provided a forced circulation device for the water inside the evaporator $c$, $d$. To this purpose, a tube $j$ shown by more solid lines in the central column $a$ of FIG. 1, removes water at the base of the tank $c$ and conveys it in a duct $k$ in which there is provided a pump $l$, as will be explained later on, which forces said water into a duct $m$ from which are branched off pipes $n$, the number of the latter being equal to that of the columns $a$. As may be seen in FIG. 1, each pipe $n$ rises again inside each column $a$ and terminates in a circular pipe $o$ arranged at the lower end of each water tank $c$. The arrangement is shown on enlarged scale in FIG. 4. The circular pipe $o$ comprises injectors $p$ which terminate centrally of the subsidiary collectors $q$, the latter being arranged radially and welded to the water tank $c$. These subsidiary collector pipes link the tank $c$ to the water-and-steam pipes $d$ arranged in concentric circles all around the tank $c$. At the level of each injector $p$ there is a venturi tube $r$ which reinforces the action of the injector, in order to produce a forced circulation of water inside the pipes $d$.

Figure 4:
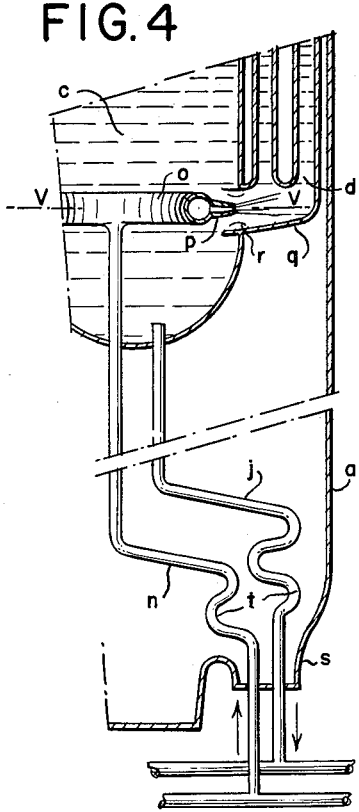
FIG. 4 is a sectional diagram on an enlarged scale of the controlled circulation system in one of the columns of FIG. 1, situated at the base of the water-and-steam tank.
Figure 5:
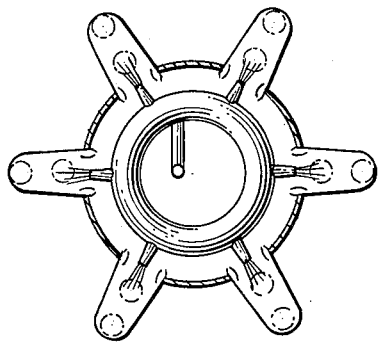
FIG. 5 is a section on the line V—V of FIG. 4.

As may be seen in FIG. 4, the pipes $n$ and $j$ pass through one or more tubular outlets $s$ provided at the bottom of the column $a$ (FIG. 4) and, if desired, may be provided with expansion-compensating bends $t$.

Figure 2:
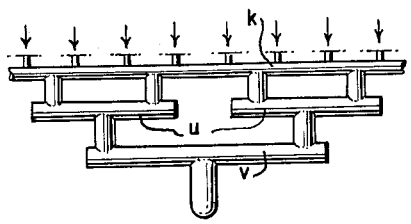
FIGS. 2 and 3 are diagrammatical representations, in front and side elevation respectively, of the connection of the pipes for removal or distribution of the water to the forced-circulation system comprising the pump.

It is essential that the forced circulation of water which is thus produced inside the water-and-steam tanks $c$, be homogeneous in all columns $a$. To ensure this, the water removal duct $k$ and the ducts $m$ for the forced distribution of water which comprise the circuit with the pump $l$, are connected in a symmetrical manner, as has been shown diagrammatically in FIGS. 2 and 3.

Figure 3:
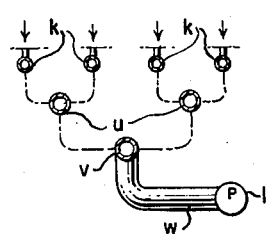

Each duct $k$ running under an array of columns $a$ branches off into one or more subsidiary collector pipes $u$ common to two parallel column arrays, as may be seen in FIG. 3, said subsidiary collector pipes *u* being in their turn connected for example to a main distribution centre *y* situated perpendicularly of the symmetrical centre of the assembly of column arrays. In the distribution centre *v* terminates the tube *w* containing the circulation pump *l* which generates the forced circulation in the distribution system. An arrangement such as described here effects the distribution of pressurized water in the ducts *m* which run underneath each array of columns *a*.

Owing to this arrangement of forced water circulation it is possible, when an additional demand for steam is made on the evaporators of columns *a*, to let the pump *l* be introduced which causes an additional circulation of water inside the water-and-steam tanks of these evaporators so as to reinforce the normal water circulation prevailing in these tanks.

Figure 6:
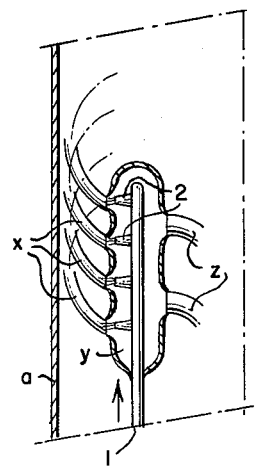
FIG. 6 is a diagrammatic representation in vertical half-section of the controlled injection of water into a vertical subsidiary collector pipe inside an evaporator with helical tubes.

The device is equally applicable to installations in which the evaporator inside the column *a* is constituted, in the manner shown diagrammatically in FIG. 6, by an assembly of pipes *x* coiled in serpentines and connected to a subsidiary collector *y* arranged vertically in parallel with the axis of the column *a*. In installations of this type the water coming from the re-heater through the tubes *z* is led into each of the vertical subsidiary collector pipes *y* and supplies the serpentine coils *x* of the evaporator.

In installations of this kind a forced distribution circuit for water according to the invention is obtained by letting the pipes 1 which are supplied with pressurized water, terminate inside each of the vertical subsidiary collector pipes *y*. Each tube 1 comprises injectors 2, the number corresponding to that of the evaporator tubes *x* linked to the subsidiary collector *y*. The forced-circulation water sent through the tube 1 is derived from the water-and-steam separator situated at the upper end of the evaporator which is not shown here. The forced circulation according to the invention may be superimposed on the forced circulation obtained in known manner by another pump, situated between a water-and-steam tank outside the column and the evaporator.

Figure 7:
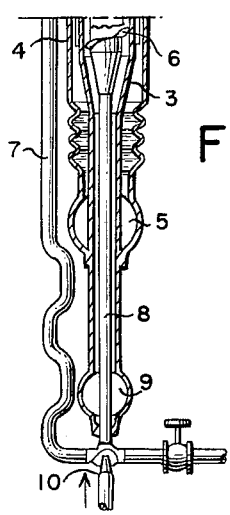
FIG. 7 is a diagrammatic representation of the lower portion of an evaporator pipe in an installation comprising a plurality of such pipes, showing the injection of water with forced circulation at the base of the pipe.

It is also possible to adapt the forced circulation device forming the object of the present invention to installations in which the evaporation of water is effected in an assembly of evaporators such as that in FIG. 7 (showing the base portion of the evaporator) which comprise a tube 3 traversed from top to bottom by water which is evaporated by the hot fluid from the reactor circulating in a space between the tube 3 and a co-axial tube 4. In FIG. 7 the hot fluid issuing from the reactor, after having acted upon the tube 3 along its entire height, leaves through the collector pipe 5. Inside the tube 3 is provided a helical device 6 ensuring the gyration of the water-and-steam mixture near the inner wall of tube 3, the steam being liberated axially whereas the water is projected tangentially on the inner wall of tube 3. In this device a water-and-steam separator, not shown, is provided at the upper end of the evaporator tube 3 and comprises a water return tube 7 which re-introduces this water at the lower end of the evaporator tube through a central pipe 8 which terminates in slots, not shown, inside the tube 3. The ordinary water supply for the tube 3 arrives through the collector pipe 9 which supplies the tube 3 at its base, as may be seen in FIG. 7.

A controlled injection of water, according to the present invention, may be effected at 10, at the lower end of the evaporator tube and, more exactly, in the very location where the water feedback tube 7 enters the vertical pipe 8, returning the water from the separator. It is also possible that the injection, instead of being effected at 10, be produced tangentially of the wall of the evaporator tube 3 at a level where the water-and-steam mixture has already assumed a gyratory movement in the tube 3. The controlled reinjected water is derived from a water-and-steam separator common to a group of evaporator tubes.

Modifications of details may be made to the embodiments of the invention. Particularly in the application shown in FIG. 1, the pipe *j* which serves for deriving water for forced circulation from the water-and-steam tank, may well be a pipe already available in the installation for the purpose of establishing a communication between, and of equalizing, water levels in different tanks *c* of the installation, as the applicant has already proposed in previous applications.

What I claim is:

1. A thermal installation for the recovery of heat from a heating fluid comprising a plurality of identical columns disposed in a plurality of parallel rows and connected to receive and discharge said heating fluid, each of said columns including mounted therein elements for the conversion of water into steam in at least one stage of pressure and comprising a water and steam tank and water and steam evaporator pipes surrounding said tank, each evaporator pipe having a lower inlet end and an upper outlet end, subsidiary collectors secured to said water and steam tank and connected to the inlet and outlet ends of said evaporator pipes, respective inlet and outlet passages defined by said evaporator pipe ends and said subsidiary collectors, said subsidiary collectors communicating with the interior of said tank and forming therewith complete circuits for the circulation of steam and water, whereby when said heating fluid flows through said columns it passes over said subsidiary collectors, evaporator pipes and water and steam tanks, a device for the controlled circulation of water in said thermal installation and comprising a plurality of tubes respectively connected to said water and steam tanks in said columns of said thermal installation, each of said tubes extending upwardly in a respective column and having an inlet end terminating interiorly of the water and steam tank in the column, an assembly of collector pipes symmetrically connected with themselves and with said tubes to form a series of parallel branches having inlet pipes and outlet pipes, said outlet pipes of preceding branches constituting the inlet pipes of immediately succeeding branches, and the last of said branches having one outlet pipe, a circulation pump communicating through said one outlet pipe with said last branch, an assembly of distributing ducts extending symmetrically from said pump and terminating in discharge pipes, each of said discharge pipes extending upwardly in a respective column into the interior of the water and steam tank of the respective column and discharging into said inlet passages defined by said subsidiary collectors, said last branch defining a distribution center and being disposed in the axis of symmetry of said rows of columns and being symmetrically associated with said columns with which it communicates.

2. A thermal installation for the recovery of heat from a heating fluid comprising a plurality of identical columns disposed in a plurality of parallel rows and connected to receive and discharge said heating fluid, each of said columns including mounted therein elements for the conversion of water into steam in at least one stage of pressure and comprising a water and steam tank and water and steam evaporator pipes surrounding said tank, each evaporator pipe having a lower inlet end and an upper outlet end, subsidiary collectors secured to said water and steam tank and connected to the inlet and outlet ends of said evaporator pipes, respective inlet and outlet passages defined by said evaporator pipe ends and said subsidiary collectors, said subsidiary collectors communicating with the interior of said tank and forming therewith complete circuits for the circulation of steam and water, whereby when said heating fluid flows through said columns it passes over said subsidiary collectors, evaporator pipes and water and steam tank, a device for the controlled circulation of water in said thermal installation and comprising a plurality of tubes respectively connected to said water and steam tanks in said columns of said thermal installation, each of said tubes extending upwardly in a respective column and having an inlet and terminating interiorly of the water and steam tank in the column, an assembly of collector pipes symmetrically connected with themselves and with said tubes to form a series of parallel branches having inlet pipes and outlet pipes, said outlet pipes of preceding branches constituting the inlet pipes of immediately succeeding branches, and the last of said branches having one outlet pipe, a circulation pump communicating through said one outlet pipe with said last branch, an assembly of distributing ducts extending symmetrically from said pump and terminating in discharge pipes, each of said discharge pipes extending upwardly in a respective column into the interior of the water and steam tanks of the respective column and discharging into said inlet passages defined by said subsidiary collectors, said last branch defining a distribution center and being disposed in the axis of symmetry of said rows of columns, and said collector pipes being disposed symmetrically in relation to said rows and in relation to said last branch, and being symmetrically associated with said columns with which it communicates.

3. A thermal installation for the recovery of heat from a heating fluid comprising a plurality of identical columns disposed in a plurality of parallel rows and connected to receive and discharge said heating fluid, each of said columns including mounted therein elements for the conversion of water into steam in at least one stage of pressure and comprising a water and steam tank and water and steam evaporator pipes surrounding said tank, each evaporator pipe having a lower inlet end and an upper outlet end, subsidiary collectors secured to said water and steam tank and connected to the inlet and outlet ends of said evaporator pipes, respective inlet and outlet passages defined by said evaporator pipe ends and said subsidiary collectors, said subsidiary collectors communicating with the interior of said tank and forming therewith complete circuits for the circulation of steam and water, whereby when said heating fluid flows through said columns it passes over said subsidiary collectors, evaporator pipes and water and steam tanks, a device for the controlled circulation of water in said thermal installation and comprising a plurality of tubes respectively connected to said water and steam tanks in said columns of said thermal installation, each of said tubes extending upwardly in a respective column and having an inlet end terminating interiorly of the water and steam tank in the column, an assembly of collector pipes symmetrically connected with themselves and with said tubes to form a series of parallel branches having inlet pipes and outlet pipes, said outlet pipes of preceding branches constituting the inlet pipes of immediately succeeding branches, and the last of said branches having one outlet pipe, a circulation pump communicating through said one outlet pipe with said last branch, an assembly of distributing ducts extending symmetrically from said pump and terminating in discharge pipes, each of said discharge pipes extending upwardly in a respective column into the interior of the water and steam tank of the respective column and discharging into said inlet passages defined by said subsidiary collectors, said last branch defining a distribution center and being disposed in the axis of symmetry of said rows and in relation to said last branch, and being symmetrically associated with said columns with which it communicates.

4. A thermal installation for the recovery of heat from a heating fluid comprising a plurality of identical columns disposed in a plurality of parallel rows and connected to receive and discharge said heating fluid, each of said columns including mounted therein elements for the conversion of water into steam in at least one stage of pressure and comprising a water and steam tank and water and steam evaporator pipes surrounding said tank, each evaporator pipe having a lower inlet end and an upper outlet end, subsidiary collectors secured to said water and steam tank and connected to the inlet and outlet ends of said evaporator pipes, respective inlet and outlet passages defined by said evaporator pipe ends and said subsidiary collectors, said subsidiary collectors communicating with the interior of said tank and forming therewith complete circuits for the circulation of steam and water, whereby when said heating fluid flows through said columns it passes over said subsidiary collectors, evaporator pipes and water and steam tanks, a device for the controlled circulation of water in said thermal installation and comprising a plurality of tubes respectively connected to said water and steam tanks in said columns of said thermal installation, each of said tubes extending upwardly in a respective column and having an inlet end terminating interiorly of the water and steam tank in the column, an assembly of collector pipes symmetrically connected with themselves and with said tubes to form a series of parallel branches having inlet pipes and outlet pipes, said outlet pipes of preceding branches constituting the inlet pipes of immediately succeeding branches, and the last of said branches having one outlet pipe, a circulation pump communicating through said one outlet pipe with said last branch, an assembly of distributing ducts extending symmetrically from said pump and terminating in discharge pipes, each of said discharge pipes extending upwardly in a respective column into the interior of the water and steam tank of the respective column and discharging into said inlet passages defined by said subsidiary collectors, said last branch defining a distribution center and being disposed in the axis of symmetry of said rows of columns, said plurality of collector pipes including a plurality of first collector pipes each extending under one of said rows, and a plurality of second collector pipes each communicating with a pair of first collector pipes.

5. A device as defined in claim 1, wherein the discharge pipes rising inside said columns comprise injector devices disposed at the end of said discharge pipes.

6. A device as defined in claim 1, wherein the discharge pipes rising inside said column each comprises a tubular ring disposed inside a water and steam tank, and connected to the end of the discharge pipe, and injectors attached to said tubular ring at the level of the inlet passages of the water and steam evaporator tubes, said injectors being adapted to inject the circulating water inside said tubes.

7. A device as defined in claim 1, wherein the discharge pipes rising inside said columns each comprises a tubular ring disposed inside a water and steam tank and connected to the end of the discharge pipe, injectors provided on said tubular ring at the level of the inlet passages of the water and steam evaporator tubes, said injectors being adapted to inject the circulating water inside said tubes, and a venturi disposed around each injector and inside said inlet passages.

References Cited in the file of this patent
UNITED STATES PATENTS

| 1,236,306 | Jackson | Aug. 7, 1917 |
| 2,704,534 | Dalin et al. | Mar. 22, 1955 |
| 2,796,050 | Rehm | June 18, 1957 |

FOREIGN PATENTS

| 1,157,405 | France | Dec. 30, 1957 |